US010240259B2

(12) United States Patent
Michud et al.

(10) Patent No.: US 10,240,259 B2
(45) Date of Patent: Mar. 26, 2019

(54) PROCESS FOR THE PRODUCTION OF SHAPED CELLULOSE ARTICLES

(71) Applicants: Aalto University Foundation, Aalto (FI); Helsingin Yliopisto, Helsinki (FI)

(72) Inventors: Anne Michud, Helsinki (FI); Alistair W. T. King, Helsinki (FI); Arno Parviainen, Helsinki (FI); Herbert Sixta, Helsinki (FI); Lauri Hauru, Helsinki (FI); Michael Hummel, Helsinki (FI); Iikka Kilpeläinen, Helsinki (FI)

(73) Assignees: Aalto University Foundation sr, Aalto (FI); Helsingin Yliopisto, Helsinki (FI)

( * ) Notice: Subject to any disclaimer, the term of this patent is extended or adjusted under 35 U.S.C. 154(b) by 552 days.

(21) Appl. No.: 14/781,928

(22) PCT Filed: Apr. 4, 2014

(86) PCT No.: PCT/FI2014/050238
§ 371 (c)(1),
(2) Date: Oct. 2, 2015

(87) PCT Pub. No.: WO2014/162062
PCT Pub. Date: Oct. 9, 2014

(65) Prior Publication Data
US 2016/0053407 A1 Feb. 25, 2016

Related U.S. Application Data

(60) Provisional application No. 61/808,415, filed on Apr. 4, 2013.

(30) Foreign Application Priority Data

Dec. 20, 2013 (FI) ..................................... 20136311

(51) Int. Cl.
*D01D 5/06* (2006.01)
*D01D 5/12* (2006.01)
*D01D 5/16* (2006.01)
*D02J 1/22* (2006.01)
*D01F 2/02* (2006.01)
*C08B 1/00* (2006.01)
*C08L 97/00* (2006.01)
*C08L 97/02* (2006.01)

(52) U.S. Cl.
CPC ................ *D01F 2/02* (2013.01); *C08B 1/003* (2013.01); *C08L 97/005* (2013.01); *C08L 97/02* (2013.01); *D10B 2201/22* (2013.01)

(58) Field of Classification Search
CPC ... D01D 5/06; D01D 5/12; D01D 5/16; D01F 2/02; D02J 1/22
USPC ................... 264/103, 178 F, 187, 203, 210.8
See application file for complete search history.

(56) References Cited

U.S. PATENT DOCUMENTS

| | | | |
|---|---|---|---|
| 2008/0241536 A1* | 10/2008 | Luo | D01F 2/02 428/393 |
| 2010/0048829 A1* | 2/2010 | D'Andola | C07D 487/04 525/418 |
| 2010/0112646 A1* | 5/2010 | Balensiefer | C12P 19/02 435/105 |
| 2012/0253030 A1* | 10/2012 | Kapoor | D01D 5/06 536/56 |

FOREIGN PATENT DOCUMENTS

| | | | |
|---|---|---|---|
| CN | 101985782 A * | 3/2011 | ............... D01F 2/08 |
| JP | 2011074113 A | 4/2011 | |
| WO | WO03029329 A2 | 4/2003 | |
| WO | WO2008043837 A1 | 4/2008 | |
| WO | WO2008090155 A1 | 7/2008 | |
| WO | WO2011161326 A2 | 12/2011 | |

OTHER PUBLICATIONS

Abstract of CN 101985782 A (published on Mar. 16, 2011).*
Alistair W.T. King et al: Distillable Acid-Base Conjugate Ionic Liquids for Cellulose Dissolution and Processing. May 23, 2011.
Tamar L. Greaves et al: Protic ionic Liquids: Properties and Applications. Jan. 1, 2008.

* cited by examiner

Primary Examiner — Leo B Tentoni
(74) Attorney, Agent, or Firm — Seppo Laine Oy

(57) ABSTRACT

A method of manufacturing a cellulose-based shaped article. The method comprises subjecting a solution of lignocellulosic material, dissolved in a distillable ionic liquid, to a spinning method, wherein the ionic liquid is a diazabicyclononene (DBN)-based ionic liquid. DBN-based ionic liquids have good dissolution power, high thermal and chemical stability, lack runaway reactions and exhibit low energy consumption, due to low spinning temperatures. The shaped cellulose articles can be used as textile fibers, high-end non-woven fibers, technical fibers, films for packaging, and barriers films in batteries, as membranes and as carbon-fiber precursors.

18 Claims, 7 Drawing Sheets

PROCESS FOR THE PRODUCTION OF SHAPED CELLULOSE ARTICLES

FIELD OF THE INVENTION

This invention relates to the production of shaped articles. More particularly, the present invention concerns a method of manufacturing cellulose-based shaped articles according to the preamble of claim 1. The invention concerns also the cellulose-based shaped articles and their use. Still further this invention concerns a solution of a lignocellulosic material dissolved in a distillable ionic liquid as defined in the preamble of claim 21.

BACKGROUND

The market for cellulose products is buoyant, with increasing demand for fibres in Asia. The textile market contains both conventional clothing (apparel) textiles as well as the more and more important technical textiles, which are used principally for their performance or functional characteristics rather than for their aesthetics, or are used for non-consumer (i.e. industrial) applications. Clothing textile market is predominantly (80%) based on cotton or polyester raw material use, both having questionable effects on environment.

Production of cotton requires a lot of water, artificial fertilizers and pesticides. Despite the un-sustainability of cotton, the product properties are appreciated by consumers as they have a good feeling to the touch ("close-to-skin-feel-good").

The consumption of technical textiles is growing four times faster than for clothing, in terms of both value and volume. The market value for technical textiles reached a global turnover of 100 billion € in 2011 and is increasing rapidly, especially in Asia. Out of this only 6% is viscose, or other wood-based cellulosics. Between 1995 and 2005, the world's consumption of technical textiles has grown by 41%. Roughly one fourth of the raw material used in technical textiles is natural based fibres (cotton, wood pulp), representing 3.8 million tons in the year 2005. The global market for non-wovens was 7.05 million tons corresponding to a market value of about 19.8 billion euros in 2010, with an estimated increase to 10 million tons by 2016. The average growth (2010-2015) for all nonwovens and sustainable nonwovens is 8.5% and 12.7%, respectively, but in certain sectors the growth can exceed 25% p.a. The growth is expected to be further accelerated by the enhanced properties of sustainable materials. The main market segments in terms of volume for nonwovens are hygiene (31.8%), construction (18.5%), wipes (15.4%) and filtration (4.0%).

Currently, approximately three quarters of the global production of man-made cellulosic fibres are based on the Viscose process. (1) From an environmental point of view, however, it is questionable whether the Viscose technique should be further promoted. The utilization of large amounts of $CS_2$ and caustic results in hazardous by-products, such as sulphur oxides, sulfides and other gases, with reduced sulphur, which may cause severe stress for the environment. Further, a substantial amount of sodium sulphate, generated through the neutralization of sulphuric acid, by sodium hydroxide, is present in the waste water.

Alternatively, the so-called Lyocell process can convert pulps, by direct dissolution in N-methylmorpholine-N-oxide (NMMO) monohydrate, into value-added products. The first patents on the manufacture of Lyocell fibres were filed by American Enka/Akzona Inc (U.S. Pat. No. 4,246,221), later by Courtaulds and Lenzing AG (EP 0 490 870, EP 0 490 870). The wood-pulp is dissolved in a solution of hot NMMO monohydrate and in contrast to the Viscose process, the spinning dope is not extruded directly into the coagulation medium (wet spinning) but passes an air gap and remains as a liquid filament for a short period of time. By drawing the fibre, before and in the coagulation zone, the characteristic high tensile strength of Lyocell fibres are gained, which—unlike Viscose fibres—remains high even under wet conditions (2).

However, the versatility of the Lyocell process is limited by certain intrinsic properties of NMMO resulting from its peculiar structure. The N—O moiety impedes the implementation of redox-active agents whereas the cyclic ether structure is prone to so called thermal runaway reactions (potentially also due to the N-oxide functionality) necessitating appropriate stabilizers (3, 4).

Ionic liquids could offer a possibility to bypass these problems (5).

WO 03/029329 A2 claims the dissolution and possibility of regeneration of cellulose in a variety of ionic liquids. DE 102005017715 A1 and WO 2006/108861 A2, and WO 2011/161326 A2 describe the dissolution of cellulose in various ionic liquids and mixtures of them with amine bases, respectively. In WO 2007/101812 A1 the intentional homogeneous degradation of cellulose in ionic liquids is demonstrated. Details concerning the fibre spinning from ionic liquid solutions can be found in DE 102004031025 B3, WO 2007/128268 A2, and WO 2009/118262 A1.

The solvents described in the cited patent documents are mainly imidazolium-based halides and carboxylates. Halides are characterized by a pronounced corrosiveness towards metal processing equipment, whereas carboxylates, and in particular 1-ethyl-3-methylimidazolium acetate, show inferior viscoelastic properties for fibre spinning.

SUMMARY OF THE INVENTION

Technical Problem

It is an object of the present invention to provide an improved method for the manufacture of cellulose-based shaped articles, especially fibres and films, where the lignocellulosic raw material, typically a chemical pulp, dissolves rapidly in the solvent, and where the solution easily can be spun to articles by a spinning method, such as an air-gap spinning, a wet spinning or a dry jet spinning method.

Another object is to achieve fibres which have strength properties comparable to or even better than commercial fibres.

Another object is particularly to provide a method where the spinning can be carried out at a relatively low temperature, i.e. at 100° C. or below, although the spinning dope is solid or highly viscous at room temperature.

A further object is to achieve a spinning dope (spinning solution) which is stable and easy to handle and store at room temperature.

A further object is to provide a method with negligible degradation of the polysaccharides in the lignocellulosic raw material and with negligible water pollution due to degradation products, especially negligible COD.

A further object is till to provide in which also lignin can be used as raw material in addition to the lignocellulosic raw material and thereby reduce the costs.

Solution to Problem

The present invention concerns a method for the manufacture of a cellulose-based shaped article, such as a fibre or a film, by subjecting a solution comprising a lignocellulosic material dissolved in a distillable ionic liquid to a spinning method, particularly an air-gap spinning, wet spinning, or dry jet wet spinning method. According to this invention, the ionic liquid is a diazabicyclononene (DBN) based ionic liquid.

In further aspects, the invention concerns a shaped cellulose-based article, preferably a fibre or film according to claim 19; the use of the products as defined in claim 20, and a solution comprising a lignocellulosic material dissolved in a distillable ionic liquid, suitable for use in a method for the manufacture of a cellulose-based shaped article as defined in claim 21.

Advantageous Effects of Invention

The method according to the present invention offers many advantages over known technique. The present solvents have a capability to dissolve the raw-material, such as wood pulp, fast. In some embodiments, the resulting solutions are solid or depict high viscosity at low temperature but relatively low viscosity at moderately elevated temperatures (up to 100° C.) and, thus, perform well in fibre spinning.

Compared to the NMMO-based Lyocell process: the DBN-based ionic liquids show better dissolution power, higher thermal and chemical stability, lacking runaway reactions and lower energy consumption due to lower spinning temperature. Compared to other known ionic liquids, in particular to those who have no halides as anions to avoid corrosion: more suitable viscoelastic properties to ensure high spinning stability, high dissolution power and recyclability through vacuum distillation.

A further advantage is the use of a stable solvent (compared to NMMO) which allows a stable spinning process for the manufacture of highly competitive fibre properties equal and superior to cotton and equal to NMMO-based Lyocell fibres.

Further advantages will appear from the following description of embodiments.

DESCRIPTION OF EMBODIMENTS

Figure 1:
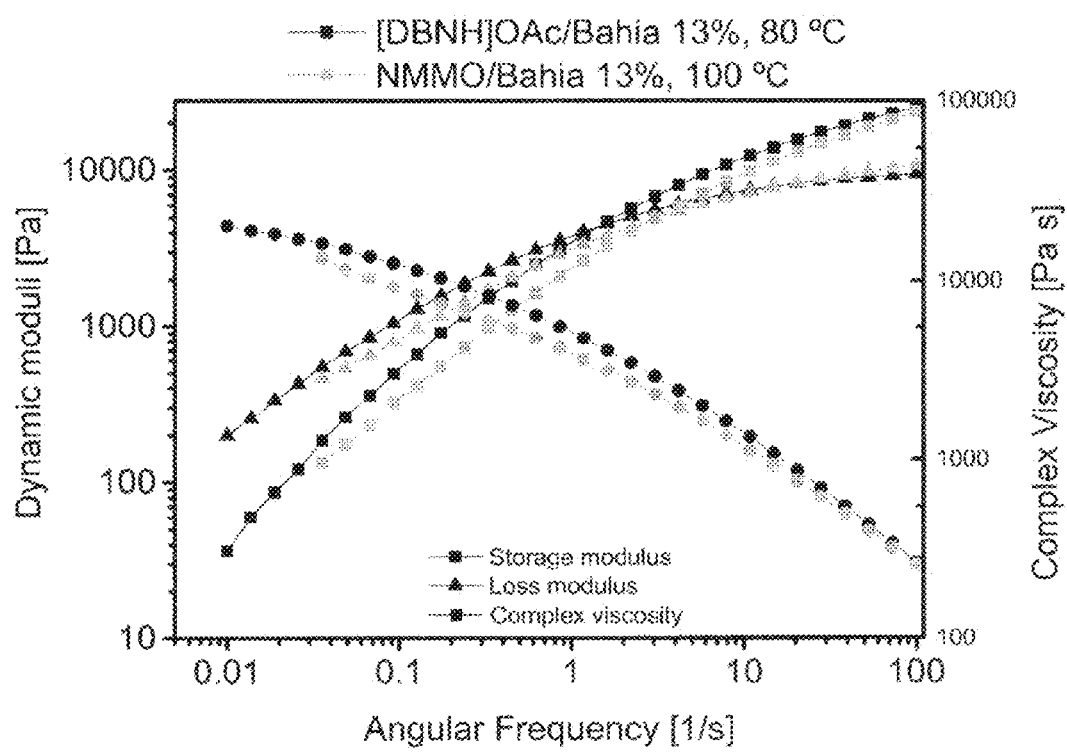
FIG. 1 shows a comparison of rheological key parameters of NMMO and [DBNH][OAc] cellulose solutions.

The use of DBN-based ionic liquids as solvents for lignocellulosic material for spinning dopes has not been described earlier. These solvents are characterized by their ability to dissolve the wood pulp rapidly. The resulting solutions are solid or have high viscosity at low temperatures but relatively low viscosity at moderately elevated temperatures (≤100° C.) and, thus, perform very well in fibre spinning.

According to a preferred embodiment, the DBN-based ionic liquid comprises a DBN-based cation with a residue R, which is selected from the group consisting of linear or branched alkyl, typically $C_1$-$C_6$ alkyl, alkoxy, alkoxyalkyl, aryl and hydrogen, and an anion that imparts a high basicity, in terms of the Kamlet-Taft beta (13) parameter.

Preferably, the DBN-based ionic liquid comprises a 1,5-diazabicyclo[4.3.0]non-5-enium cation of the formula (I)

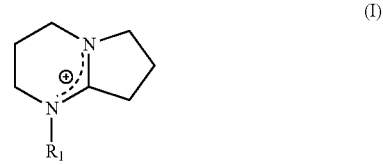

(I)

wherein $R_1$ is selected from the group consisting of hydrogen, linear and branched $C_1$-$C_6$ alkyl, $C_1$-$C_6$ alkoxy, $C_1$-$C_{10}$ alkoxyalkyl and $C_{6-18}$ aryl groups, which optionally are substituted with one or more substituents selected from hydroxy and halogen, and an anion selected from halides, such as fluoride, chloride, bromide and iodide; pseudohalides, such as cyanide, thiocyanide, and cyanate; a carboxylate, preferably formate, acetate, propionate, or butyrate; an alkyl sulphite, an alkyl sulphate, a dialkyl phosphite, a dialkyl phosphate, a dialkyl phosphonites, and a dialkyl phosphonate.

More preferably, the DBN-based ionic liquid has a 1,5-diazabicyclo[4.3.0]non-5-enium cation of formula (I) above, where $R_1$ is H, and the anion is a carboxylate anion, preferably formate, acetate, propionate or butyrate.

The most preferred DBN-based ionic liquids are [DBNH][CO$_2$Et] and [DBNH][OAc].

The lignocellulosic material is typically a chemical, mechanical or chemimechanical pulp produced from wood or a non-wood source, preferably a bleached or unbleached chemical pulp, produced by a known pulping process, such as kraft, pre-hydrolysis kraft, soda anthraquinone (AQ), sulphite, organosolv, alkaline sulfite anthraquinone methanol (ASAM), alkaline sulfite anthraquinone (ASA), and monoethanolamine (MEA), most preferably a bleached dissolving pulp.

In one preferred embodiment, the solution additionally comprised of a lignin or of lignin-containing pulp.

The lignin is derived from a pulping process, preferably alkali lignin, kraft lignin, soda-AQ lignin, lignosulphonate, thiolignin, organosolv-lignin, ASAM-lignin or ionic liquid-extracted lignin (ILL).

The solution of the lignocellulosic material, optionally in combination with lignin, dissolved in the distillable DBN-based ionic liquid, is preferably shaped into a fibre or film by

- extruding the solution through a spinning nozzle, for example a spinneret into an air-gap,
- shaping it as a filament or film by stretching the film or filament while still in solution to orient the molecules, and
- after passing through the air-gap, the fibres or film are drawn through a water-containing spin bath, where the cellulose is regenerated.

Preferably, the spinning solution has a zero shear viscosity between 5,000 and 70,000 Pas, preferentially 30,000 Pas, at spinning conditions.

The solvent withdrawn from the solution is preferably purified by vacuum distillation.

The cellulose fibre produced by this method has a dry tenacity of >35 cN/tex and a wet-to-dry tenacity of >0.80, preferably a dry tenacity of ≥40 cN/tex or even ≥45 cN/tex, and a wet-to-dry tenacity of ≥0.90.

The polysaccharides present in the lignocellulosic pulp used as raw material undergo no or negligible degradation during the process.

The process causes negligible water pollution due to degradation products, especially negligible COD.

DBN-based ionic liquids, in particular [DBNH] carboxylates show superior solubility and spinnability properties. The pulp is dissolved extremely fast at moderate temperatures with only gentle stirring. In contrast to NMMO, no water has to be evaporated from a solvent-water mixture but the pulp is dissolved directly in the ionic liquid. This accelerates the preparation step substantially. The resulting solution shows similar viscoelastic properties as NMMO solutions, but already at lower temperatures and is, thus, less energy consuming when processed (FIG. 1). The filament stability in the fibre spinning process is excellent. High draw ratios of >10 can be accomplished. The resulting fibres are similar or slightly superior to commercial fibres in terms of strength properties (Table 1).

TABLE 1

Properties of commercial textile fibres (2) and fibres spun from [DBNH][OAc]

|  | Viscose | Modal | NMMO Tencell | [DBNH][OAc] |
|---|---|---|---|---|
| Titre [dtex] | 1.4 | 1.3 | 1.3 | 1.9 |
| Tenacity cond. [cN/dtex] | 23.9 | 33.1 | 40.2 | 45.7 |
| Elongation cond. [%] | 20.1 | 13.5 | 13.0 | 9.2 |
| Tenacity wet [cN/dtex] | 12.5 | 18.4 | 37.5 | 41.9 |
| Elongation wet [%] | 22.0 | 14.1 | 18.4 | 11.3 |

Table 1 shows that the fibres spun from [DBNH][OAc] show even better strength properties than the commercial fibres.

The following non-limiting examples illustrate the invention.

Example 1: Preparation of the Spinning Dope 5-20 wt-% pulp (preferentially 10-15 wt-%) are mixed in the neat DBN-based distillable ionic liquid [DBNH][OAc] and the suspension is transferred to a vertical kneader system (or a stirrer at smaller scale). Dissolution proceeds fast (within time periods of 0.5-3 h) at low revolution (10 rpm) and moderate temperature (60° C.-100° C.). The resulting solution can be filtrated by means of a pressure filtration, equipped with a metal fleece filter (fineness 5 μm absolute) and is degassed in a heated vacuum environment. However, those two steps are not necessarily required.

The spinning dope is then transformed in hot, liquid state to the cylinder of the piston-spinning unit. The spinning conditions are summarized in Example 2 below. The fibres were washed and dried online by means of a washing bath and drying channel, respectively.

Naturally, it is also possible to transfer the spinning dope as solid pieces at room temperature to the cylinder of the piston-spinning unit.

Example 2: Spinning of DBN-Based Dopes

Figure 2:
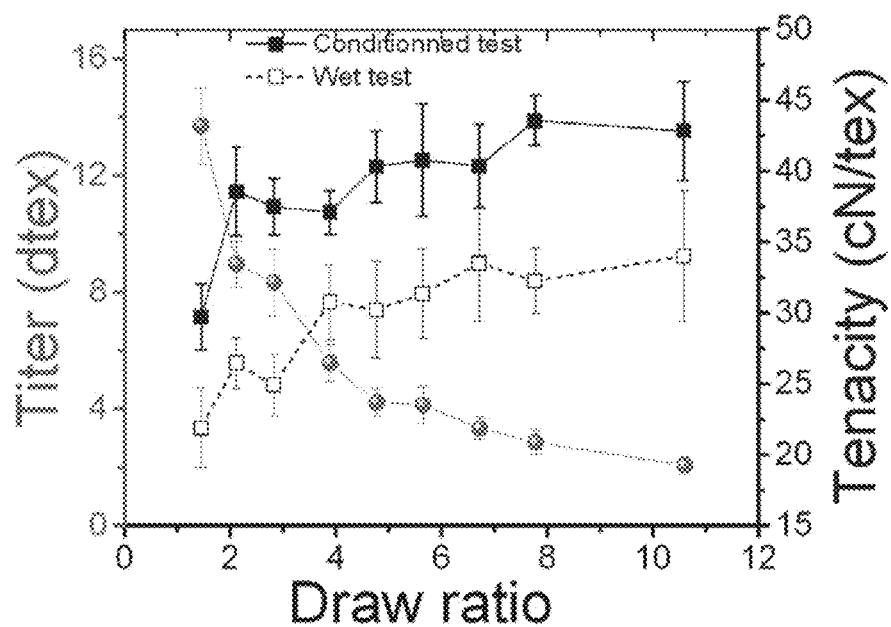
FIG. 2 shows the properties of [DBNH][OAc] spun fibres as function of draw for a 13 wt-% solution of Bahia pulp in [DBNH][OAc]
Figure 3:
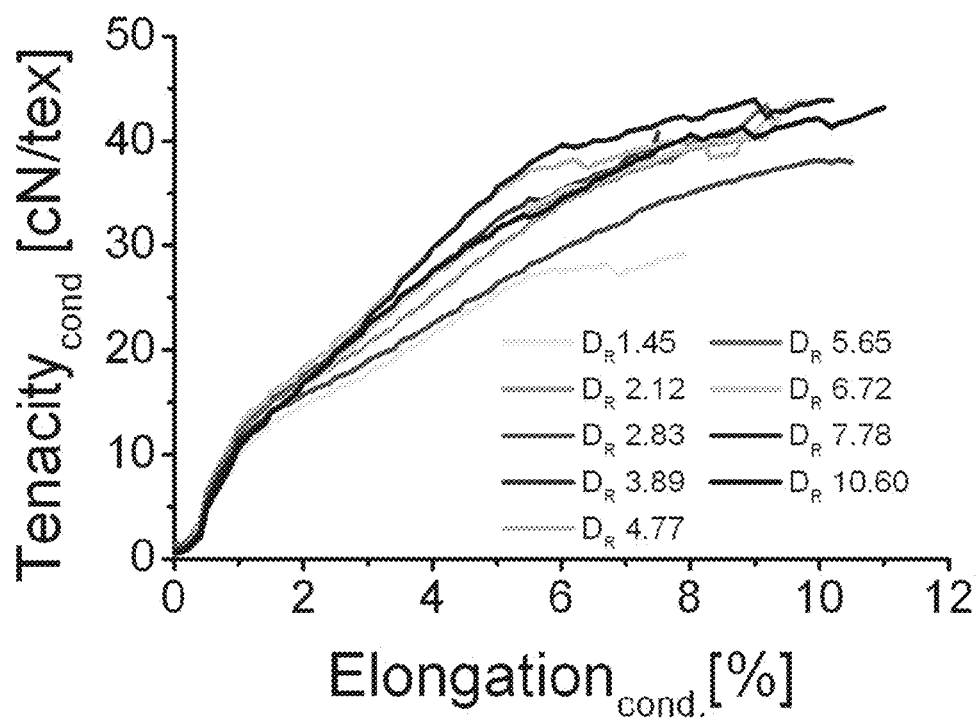
FIG. 3 shows the tenacity for [DBNH][OAc] spun fibres as function of elongation for a 13 wt-% solution of Bahia pulp in [DBNH][OAc]
Figure 4:
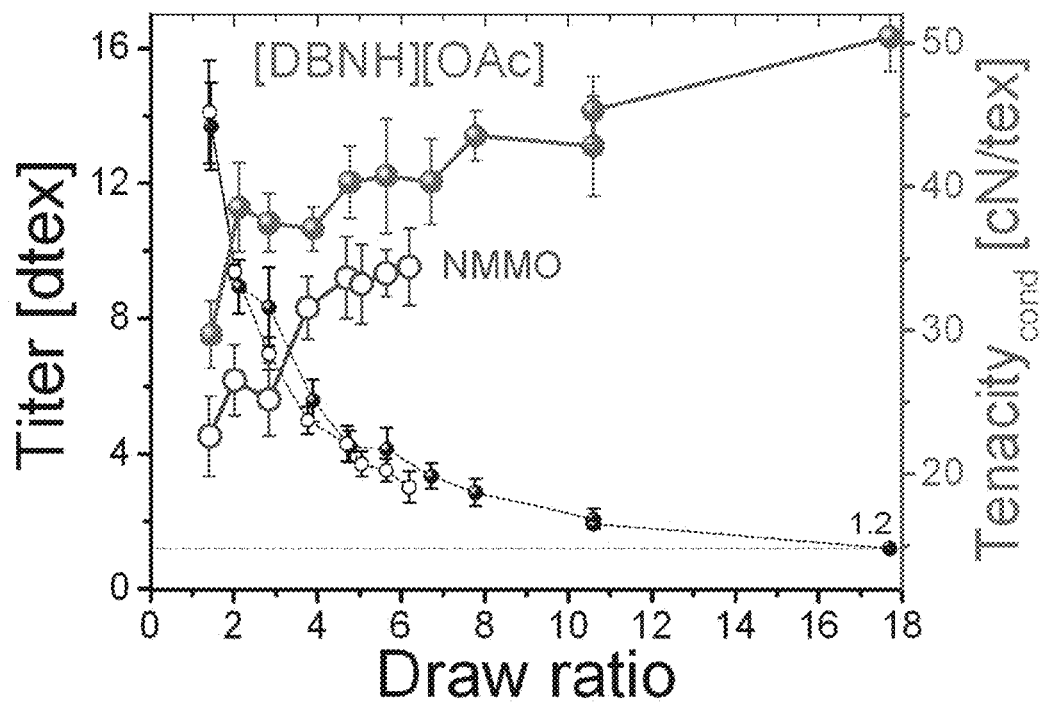
FIG. 4 shows the properties of [DBNH][OAc] spun fibres and NMMOxH$_2$O spun fibres as function of draw for a 13 wt-% solution of Bahia pulp in [DBNH][OAc] or NMMOxH$_2$O.
Figure 5:
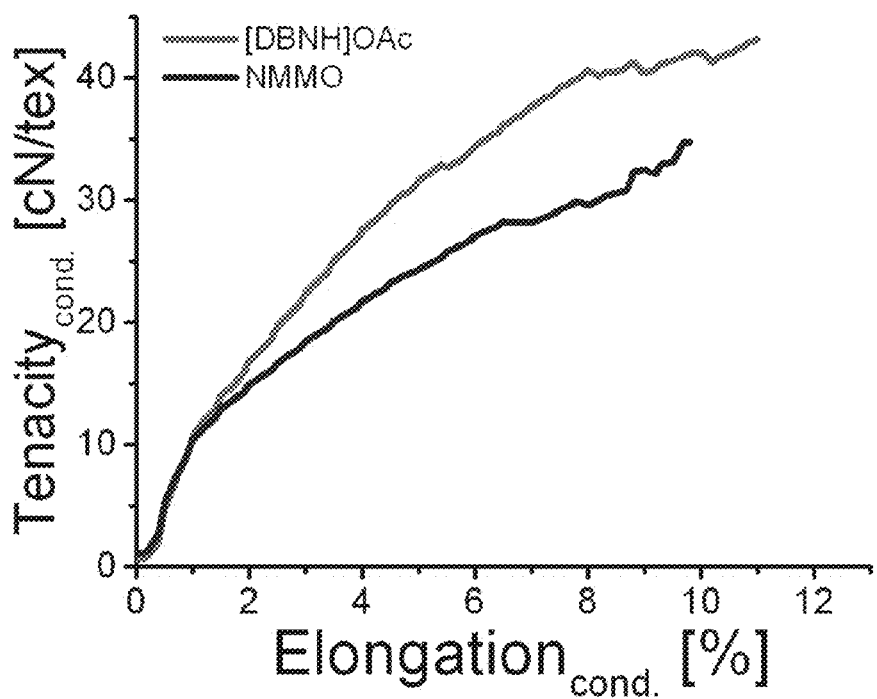
FIG. 5 shows the tenacity for [DBNH][OAc] spun fibres or NMMOxH$_2$O spun fibres as function of elongation for a 13 wt-% solution of Bahia pulp in [DBNH][OAc] or NMMOxH$_2$O.
Figure 6:
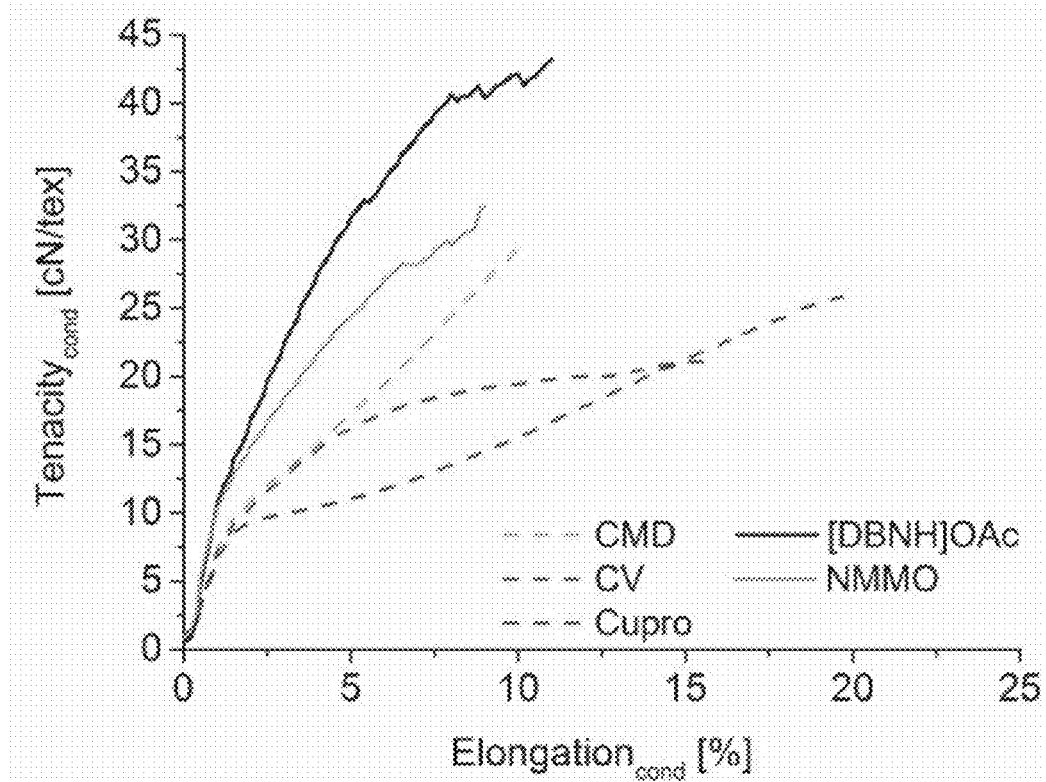
FIG. 6 shows the tenacity for [DBNH][OAc] spun fibres and commercial cellulose fibres as function of elongation.

Spinning dope (13 wt-% pre-hydrolysis eucalyptus kraft pulp in [DBNH][OAc]) prepared as described in Example 1 is spun through a multi-filament spinneret (18 holes, 100 μm capillary diameter) at 80° C. with an extrusion velocity of 0.8 ml/min. The take-up velocity was varied systematically to set different draw-ratios. Temperature of the coagualtion bath: 14-18° C.; the washing bath 50° C., and the drying channel 80° C. Further parameter and the properties of the resulting fibres are given in Table 2 and FIG. 2. The filaments depicted excellent spinning stability over the whole range investigated.

TABLE 2

Spinning parameter and fiber properties (godet 1: filament up-take after coagulation bath, godet 2: after washing bath, godets 3 + 4: after drying channel).

| Spinning conditions | | | | | Titer | | Force | | | | Tensile test Conditionned Ten, | |
|---|---|---|---|---|---|---|---|---|---|---|---|---|
| godet 1 | godet 2 | godet 3 | godet 4 | draw | dtex | +/− | cN | +/− | Elong. % | +/− | cN/tex | +/− |
| 7 | 8 | 8.2 | 8.2 | 1.45 | 13.85 | 1.61 | 40.86 | 2.64 | 6.58 | 1.00 | 29.70 | 2.32 |
| 10.9 | 11.7 | 12 | 12 | 2.12 | 9.02 | 0.70 | 34.64 | 2.30 | 8.37 | 1.00 | 38.57 | 3.12 |
| 15 | 15.7 | 16 | 16 | 2.83 | 7.60 | 0.96 | 28.38 | 2.64 | 10.03 | 1.19 | 37.49 | 2.01 |
| 20.7 | 21.6 | 22 | 22 | 3.89 | 5.75 | 0.72 | 21.25 | 2.10 | 7.14 | 1.05 | 37.10 | 1.54 |
| 25.4 | 26.5 | 27 | 27 | 4.77 | 4.31 | 0.47 | 17.34 | 1.96 | 7.01 | 1.37 | 40.33 | 2.53 |
| 31 | 31.8 | 32 | 32 | 5.65 | 4.28 | 0.75 | 17.20 | 2.00 | 8.54 | 0.69 | 40.76 | 3.96 |
| 37.1 | 37.8 | 38 | 38 | 6.72 | 3.59 | 0.36 | 14.41 | 1.11 | 8.40 | 1.02 | 40.37 | 2.96 |
| 43.3 | 43.8 | 44 | 44 | 7.78 | 2.64 | 0.30 | 11.49 | 1.23 | 7.67 | 1.36 | 43.56 | 1.75 |

TABLE 2-continued

Spinning parameter and fiber properties (godet 1: filament up-take after coagulation bath, godet 2: after washing bath, godets 3 + 4: after drying channel).

| | | | | | | | | | | | |
|---|---|---|---|---|---|---|---|---|---|---|---|
| 60 | — | — | — | 10.60 | 1.91 | 0.32 | 9.02 | 1.71 | 9.46 | 1.08 | 47.14 | 4.17 |

| | | | | | Tensile test Wet | | | | | | |
|---|---|---|---|---|---|---|---|---|---|---|---|
| Spinning conditions | | | | Titer | Force | | | | | Ten, | |
| godet 1 | godet 2 | godet 3 | godet 4 | draw | dtex | +/− | cN | +/− | Elong. % | +/− | cN/tex | +/− |
| 7 | 8 | 8.2 | 8.2 | 1.45 | 13.53 | 0.99 | 29.45 | 2.61 | 10.81 | 2.05 | 21.91 | 2.82 |
| 10.9 | 11.7 | 12 | 12 | 2.12 | 8.88 | 0.87 | 23.47 | 2.49 | 10.64 | 1.49 | 26.46 | 1.81 |
| 15 | 15.7 | 16 | 16 | 2.83 | 9.09 | 1.37 | 22.45 | 2.49 | 13.47 | 1.50 | 24.92 | 2.18 |
| 20.7 | 21.6 | 22 | 22 | 3.89 | 5.40 | 0.55 | 16.56 | 1.61 | 11.00 | 1.08 | 30.78 | 2.66 |
| 25.4 | 26.5 | 27 | 27 | 4.77 | 4.14 | 0.44 | 12.46 | 1.58 | 8.13 | 1.53 | 30.21 | 3.40 |
| 31 | 31.8 | 32 | 32 | 5.65 | 4.00 | 0.48 | 12.53 | 1.93 | 10.86 | 2.04 | 31.38 | 3.17 |
| 37.1 | 37.8 | 38 | 38 | 6.72 | 3.09 | 0.39 | 10.26 | 1.31 | 10.90 | 1.26 | 33.49 | 4.06 |
| 43.3 | 43.8 | 44 | 44 | 7.78 | 3.09 | 0.52 | 10.00 | 1.98 | 11.10 | 1.82 | 32.26 | 2.31 |
| 60 | — | — | — | 10.60 | 1.94 | 0.20 | 7.97 | 0.78 | 12.09 | 0.53 | 41.26 | 4.24 |

Example 3: Fibres from Lignin and Cellulose Blends

Lignin from commercial sources (Kraft Lignin) was mixed with commercial Eucalyptus (pre-hydrolysis kraft, PHK) pulp in ratios up to 20:80 and dissolved in [DBNH][OAc] to yield a concentration of 13 wt-%. The spinning temperature was adjusted such that the zero shear viscosity was between 20000 and 30000 Pas. The fibre regeneration was accomplished in water at a temperature of 10-20° C., preferably below 15° C. through an air gap with a fixed length of 10 mm.

Figure 8:
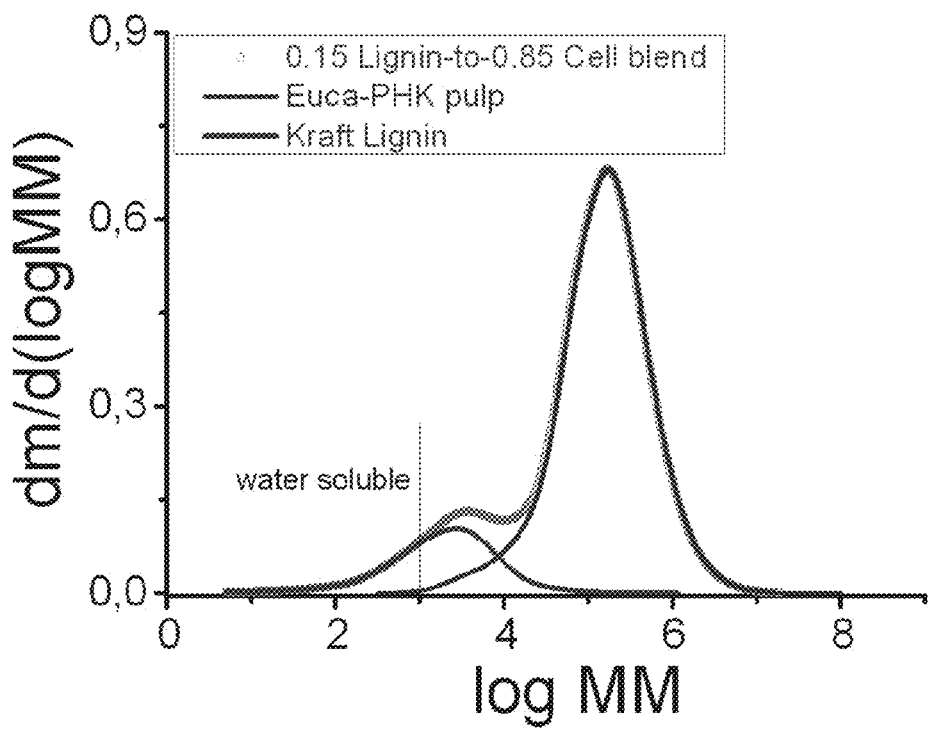
FIG. 8 shows the molar mass distribution for Kraft lignin, eucalyptus pre-hydrolysis kraft (Euca-PHK) and a blend of 15 wt-% soda-AQ lignin with 85 wt-% Euca-PHK.
Figure 9:
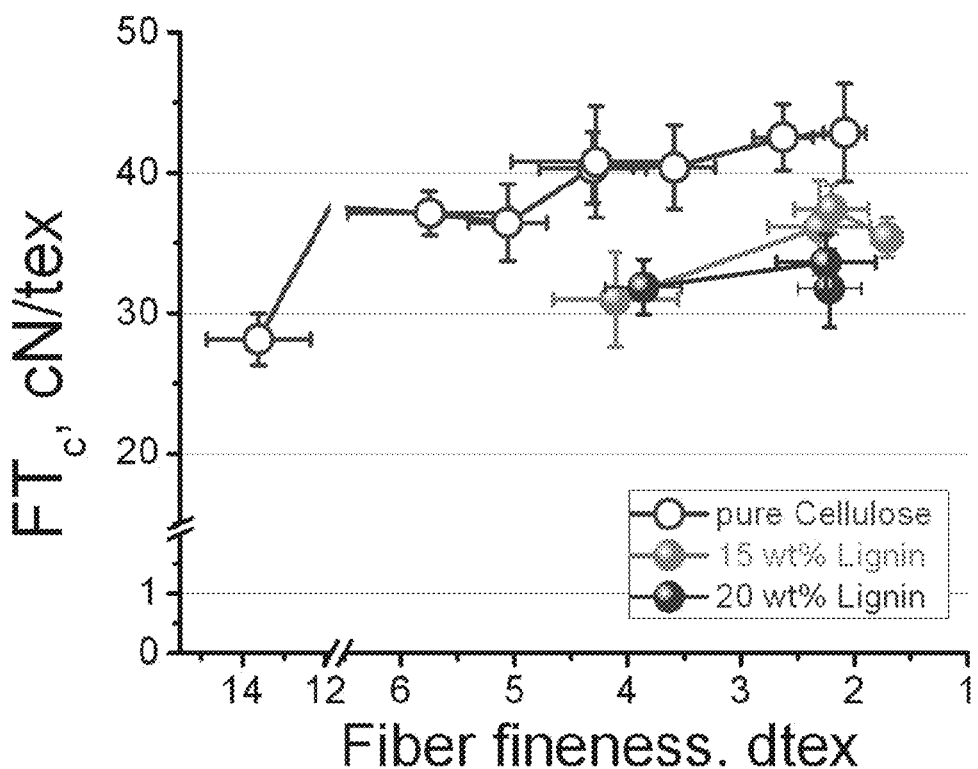
FIG. 9 shows the fibre tenacity as function of fibre fineness for pure cellulose, and blends of 15 wt-% resp. 20 wt-% soda AQ lignin with Euca-PHK pulp.

The properties of fibres made from lignin cellulose blends are shown in FIGS. 8 and 9.

The spinning of these dopes, according to the present invention, shows important advantages over NMMO and [EMIM][OAc]-based dopes. This can be seen in Table 3 below.

Table 3 shows shear rheology of the spinning dope according to this invention, compared with known NMMO- and [EMIM][OAc]-based spinning dopes

| | Temperature [° C.] | Viscosity $\eta_0$ [Pa s] | $\omega$ [1/s] | G [Pa] |
|---|---|---|---|---|
| [DBNH][OAc] 13 wt-% | 80 | 21306 | 1.5 | 4100 |
| NMMO 13 wt-% | 100 | 20000 | 3.0 | 4955 |
| [EMIM][OAc] 20 wt-% | 95 | 20262 | 1.9 | 5000 |

The spinning temperature was chosen according to the visco-elastic properties of the dopes. [DBNH][OAc], even though solid at room temperature, shows much lower viscosity than the corresponding NMMO dopes. Thus, the spinning temperature can be lowered by 20° C. or more.

FIGS. 3-6 show that fibres spun from [DBNH][OAc] show even better strength properties than commercial fibres.

Table 4 shows the fiber properties spun from different concentrations of the present spinning dope at different draw ratios.

TABLE 4

Fiber properties spun from different concentrations at different draw ratios.

| Draw | Pulp con-centration | conditioned | | | | wet | | | |
|---|---|---|---|---|---|---|---|---|---|
| | | Titer (dtex) | Force (cN) | Elong. (%) | Tenacity (cN/tex) | Titer (dtex) | Force (cN) | Elong. (%) | Tenacity (cN/tex) |
| 5.3 | 13% | 3.44 ± 0.29 | 13.73 ± 1.18 | 8.83 ± 0.91 | 40.03 ± 2.86 | 3.48 ± 0.34 | 11.38 ± 1.02 | 11.70 ± 0.78 | 32.81 ± 3.04 |
| | 15% | 4.27 ± 0.31 | 19.51 ± 2.26 | 10.05 ± 1.37 | 45.62 ± 3.07 | 3.64 ± 0.20 | 16.43 ± 1.39 | 13.53 ± 0.97 | 45.21 ± 3.01 |
| | 17% | 4.15 ± 0.46 | 22.34 ± 2.98 | 10.38 ± 1.02 | 53.83 ± 2.94 | 3.85 ± 0.50 | 17.27 ± 2.35 | 12.20 ± 0.76 | 44.99 ± 3.75 |
| 10.6 | 13% | 1.91 ± 0.32 | 9.02 ± 1.71 | 9.46 ± 1.08 | 47.14 ± 4.17 | 1.94 ± 0.20 | 7.97 ± 0.78 | 12.09 ± 0.53 | 41.26 ± 4.24 |
| | 15% | 2.25 ± 0.13 | 12.21 ± 0.68 | 10.68 ± 0.65 | 54.36 ± 2.09 | 1.89 ± 0.11 | 9.66 ± 0.79 | 15.45 ± 1.16 | 51.15 ± 3.85 |
| | 17% | 2.11 ± 0.35 | 11.64 ± 2.05 | 11.08 ± 1.69 | 55.22 ± 3.29 | 2.08 ± 0.27 | 10.81 ± 1.07 | 12.43 ± 1.13 | 52.23 ± 3.86 |
| 14 | 17% | 1.73 ± 0.20 | 9.53 ± 0.82 | 9.72 ± 1.24 | 55.45 ± 3.44 | 1.49 ± 0.17 | 7.22 ± 0.71 | 11.56 ± 0.92 | 48.50 ± 3.28 |
| 17.7 | 13% | 1.21 ± 0.14 | 6.08 ± 0.80 | 8.50 ± 0.83 | 50.45 ± 4.75 | 1.18 ± 0.18 | 5.42 ± 0.84 | 9.60 ± 1.13 | 46.35 ± 5.20 |
| | 15% | 1.35 ± 0.19 | 7.72 ± 0.65 | 9.6 ± 1.24 | 57.60 ± 3.37 | 1.09 ± 0.21 | 6.11 ± 1.01 | 10.69 ± 1.13 | 56.65 ± 3.71 |

Figure 7:
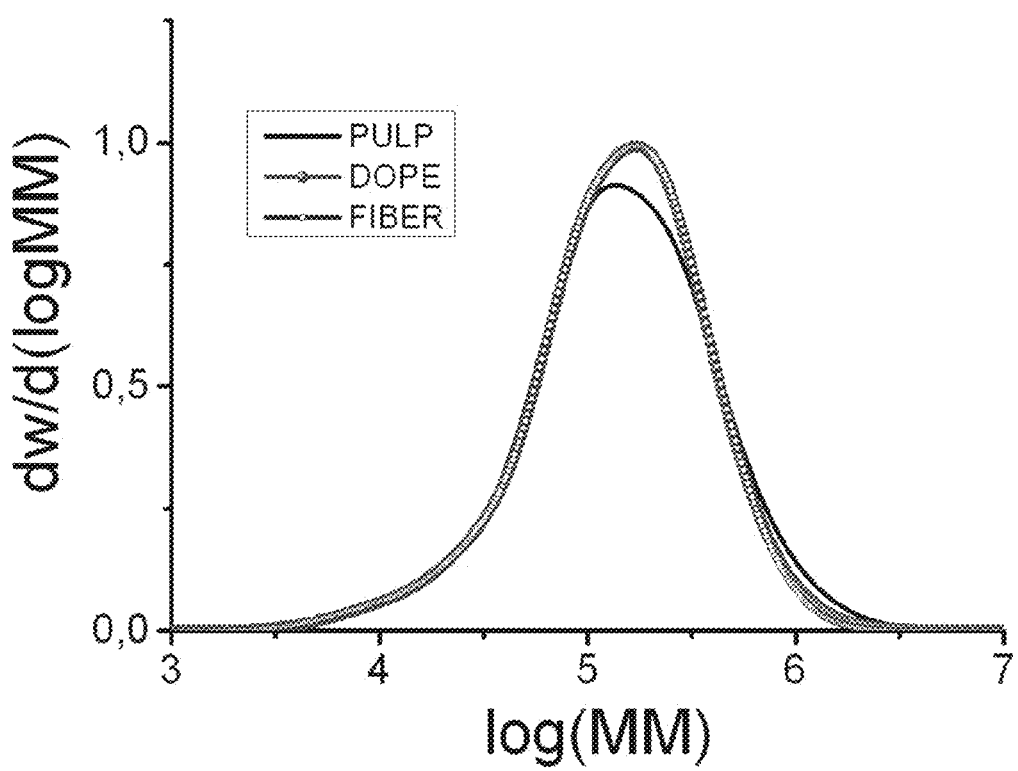
FIG. 7 shows the molar mass distribution (SEC-MALLS) for the pulp, the dope and the fibre.

From FIG. 7, which shows the molar mass distribution (SEC-MALLS) for the pulp, the dope and the fibre, one can conclude that basically no depolymerization has occurred during the dissolution and fibre processing steps. The deviations shown are likely caused by variations in the measurement. The very little degradation (see Table 4 below) could further be reduced by reduced dissolution temperature (85° C.). Spinning temperature was 72° C.

TABLE 4

| kDa | PULP | DOPE | FIBER |
|---|---|---|---|
| Mw | 240.4 | 216.0 | 207.5 |
| Mn | 72.2 | 76.8 | 74.6 |
| PDI | 3.3 | 2.8 | 2.8 |

Figure 10A:
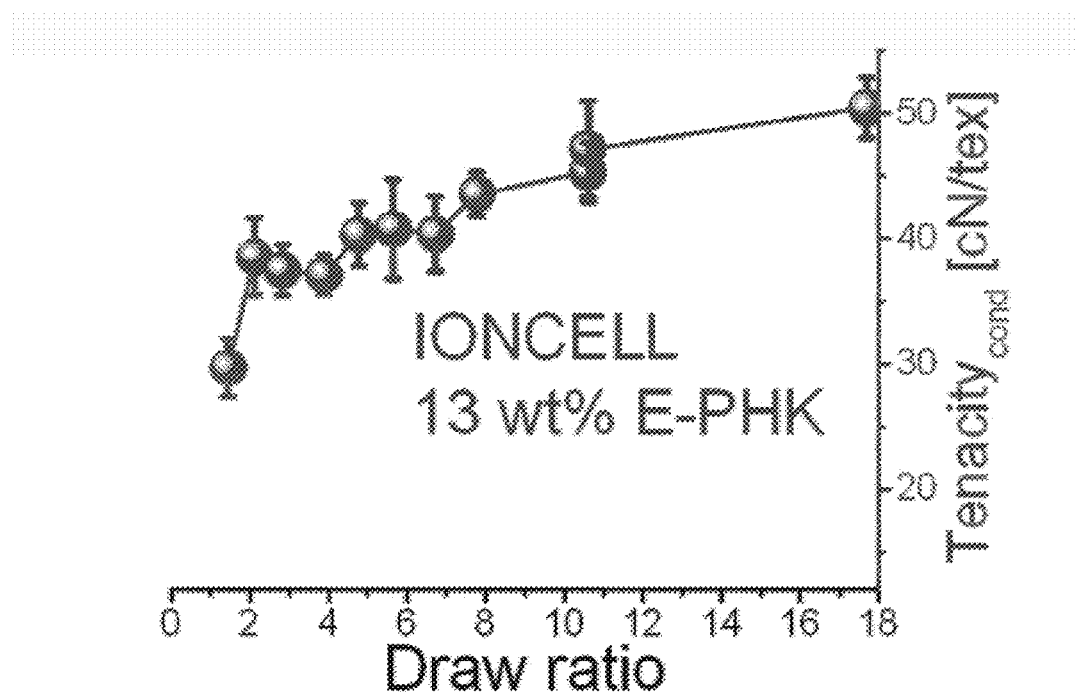
FIGS. 10a and 10b show draw ratio vs. fibre properties for the fibres according to the present invention (AALTO fibre) and NMMO fibres.
Figure 10B:
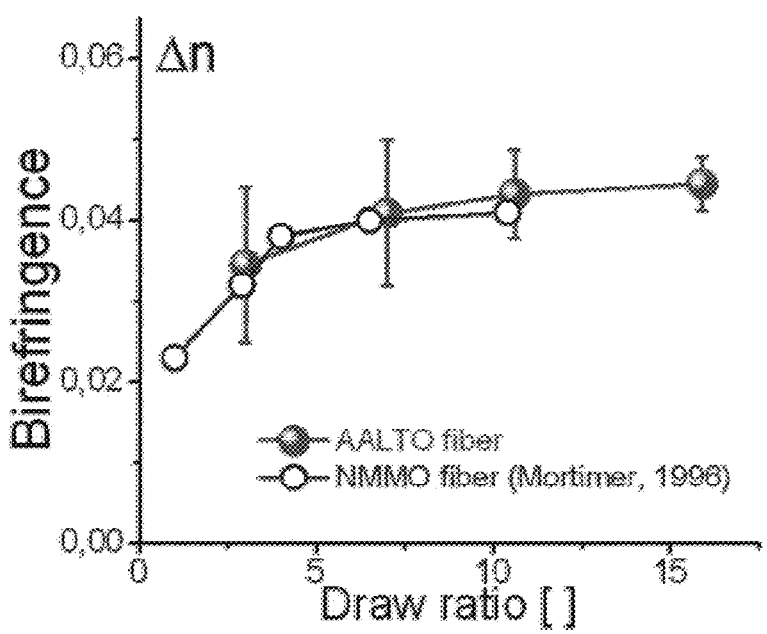

FIGS. 10a and 10b show draw ratio vs. fiber properties for the fibres according to the present invention (AALTO fiber) and NMMO fibres.

Figure 11:
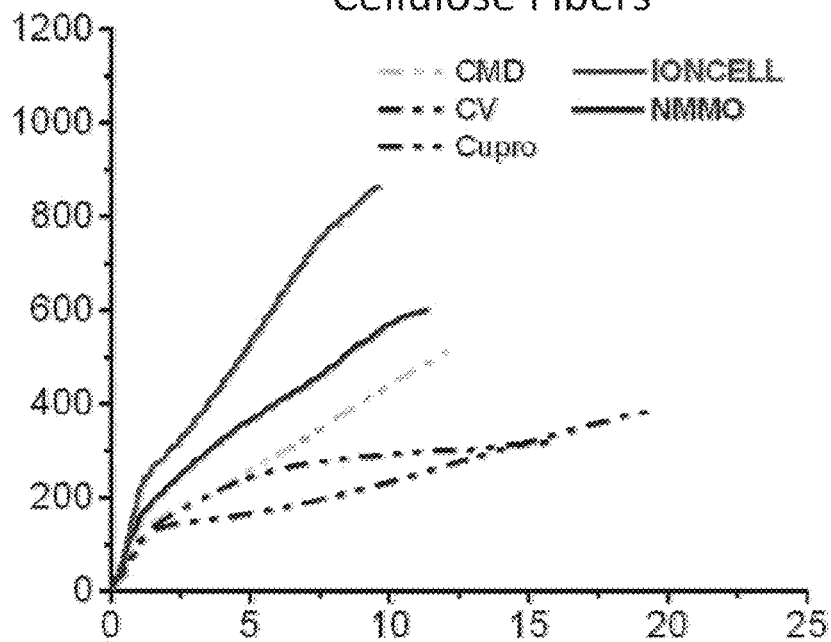
FIG. 11 shows stress-starin curves of regenerated cellulose fibres.

FIG. 11 shows stress-strain curves of regenerated cellulose fibres.

Figure 12A:
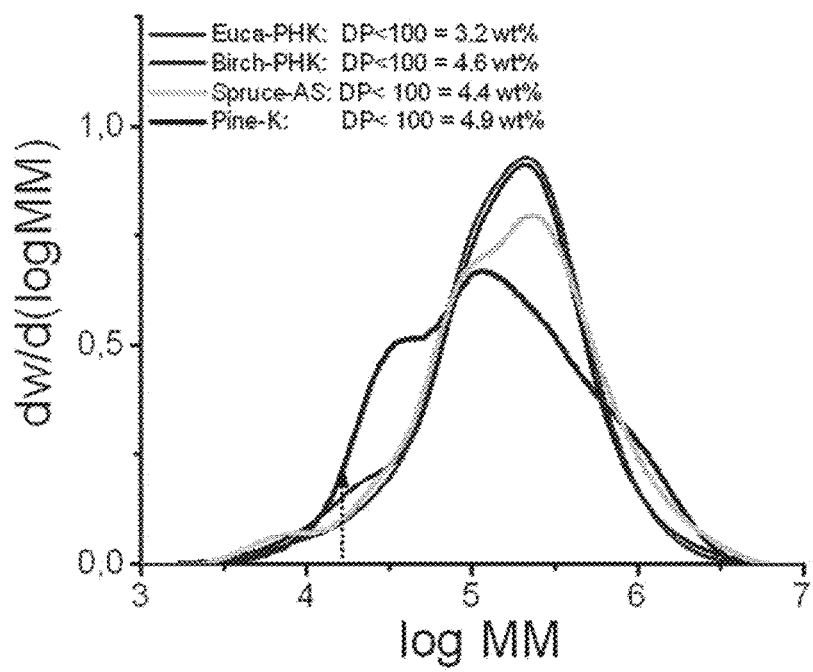
FIGS. 12a and 12b show the effect of pulp source on fibre properties.
Figure 12B:
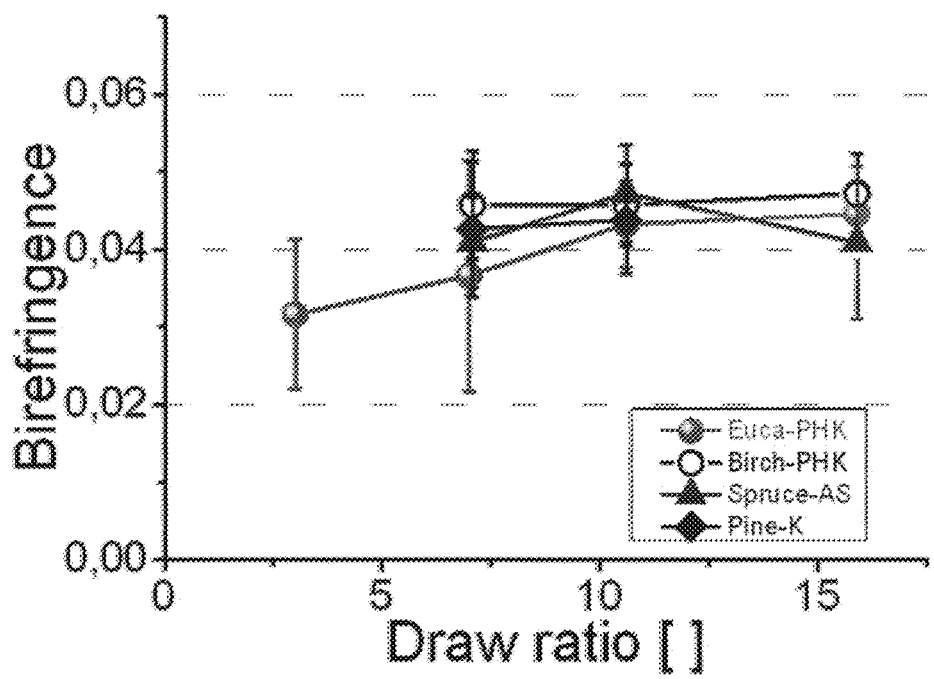

FIGS. 12a and 12b show the effect of pulp source on fibre properties. These matters are also shown in Table 5 below.

TABLE 5

| Wood | Pulp Process | Hemi | Dope wt % pulp | Titer dtex | DR | $\sigma_c$ cN/tex | $\varepsilon_c$ % | $\sigma_w$ cN/tex | $\varepsilon_c$ % | E GPa |
|---|---|---|---|---|---|---|---|---|---|---|
| Euca | PHK | 2.6 | 13 | 1.2 | 17.7 | 50.5 | 8.5 | 46.4 | 11.5 | 26.5 |
| Birch | PHK | 5.6 | 13 | 1.6 | 12.4 | 52.6 | 10.1 | 46.0 | 11.4 | 19.7 |
| Spruce | AS | 3.3 | 13 | 1.6 | 12.4 | 48.5 | 10.0 | 45.7 | 11.8 | 21.7 |
| Pine | Kraft | 15.1 | 13 | 1.7 | 10.6 | 48.4 | 11.0 | 41.3 | 11.2 | 25.1 |

No or negligible water pollution from pulp degradation products was observed. The measurements could not identify any measurable COD (chemical oxygen demand) caused by carbohydrate degradation. Thus, it is assumed that the COD caused by carbohydrate degradation is less than 5 kg COD/t of pulp. When using the same pulp (Eucalyptus PHK pulp), the pulp specific emissions during the viscose process (dissolution and degradation of alkali-soluble fraction) is about 40 kg/t of pulp.

INDUSTRIAL APPLICABILITY

The shaped cellulose-based articles produced by the method of this invention can be used as textile fibres, high-end non-woven fibres, technical fibres, films for packaging with superior properties than cellophane but comparable to polyethylene films, barriers films in batteries, membranes etc. The fibres can also be used as carbon fibre precursors.

CITATION LIST

Patent Literature

WO 03/029329 A2
DE 102005017715 A1
WO 2006/108861 A2
WO 2011/161326 A2
WO 2007/101812 A1
DE 102004031025 B3
WO 2007/128268 A2
WO 2009/118262 A1

Non Patent Literature

1. Bywater, N. (2011) The global viscose fibre industry in the 21st century—the first 10 years. *Lenzinger Ber.* 89:22-29.
2. Röder, T., Moosbauer, J., Kliba, G., Schlader, S., Zuckerstätter, G., Sixta, H. (2009) Comparative characterisation of man-made regenerated cellulose fibres. *Lenzinger Ber.* 87:98-105.
3. Buijtenhuijs, F. A., Abbas, M., Witteveen, A. J. (1986). The degradation and stabilization of cellulose dissolved in N-methylmorpholine N-oxide (NMMO). *Papier* (Darmstadt) 40:615-619.
4. Rosenau, Thomas; Potthast, Antje; Sixta, Herbert; Kosma, Paul (2001) The chemistry of side reactions and byproduct formation in the system NMMO/cellulose (Lyocell process). *Progress in Polymer Science* 26(9):1763-1837.
5. Swatloski, R. P., Spear, S. K., Holbrey, J. D., Rogers, R. D. (2002) Dissolution of Cellose with Ionic Liquids. *J. Am. Chem. Soc.* 124:4974-4975.

The invention claimed is:

1. A method of manufacturing of a cellulose-based shaped article by subjecting a solution comprising a lignocellulosic material dissolved in a distillable ionic liquid to a spinning method, wherein the ionic liquid is a diazabicyclononene (DBN) based ionic liquid.

2. The method according to claim 1, wherein the DBN-based ionic liquid comprises a DBN-based cation and an anion that imparts a high basicity, in terms of the Kamlet-Taft beta (β) parameter, said DBN-based cation having a residue R, which is selected from linear and branched alkyl, typically $C_1$-$C_6$ alkyl, alkoxy, alkoxyalkyl and aryl groups, and hydrogen.

3. The method according to claim 1, wherein the DBN-based ionic liquid comprises a 1,5-diazabicyclo[4.3.0]non-5-enium cation of the formula (I)

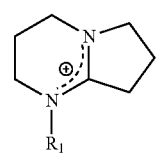

(I)

$R_1$ is selected from the group of hydrogen, linear and branched $C_1$-$C_6$ alkyl, $C_1$-$C_6$ alkoxy, $C_1$-$C_{10}$ alkoxyalkyl and $C_{6-18}$ aryl groups, an anion selected from halides; pseudohalides; a carboxylate; an alkyl sulphite, an alkyl sulphate, a dialkyl phosphite, a dialkyl phosphate, a dialkyl phosphonites, and a dialkyl phosphonate.

4. The method according to claim 1, wherein the DBN-based ionic liquid has a 1,5-diazabicyclo[4.3.0]non-5-enium cation of Formula (I) in claim 3, where $R_1$ is H, and a carboxylate anion.

5. The method according to claim 1, wherein the DBN-based ionic liquid is [DBNH][CO₂Et] or [DBNH][OAc].

6. The method according to claim 1, wherein the lignocellulosic material is a chemical, mechanical or chemimechanical pulp produced from wood or a non-wood source, or where the lignocellulosic material is a waste material.

7. The method according to claim 1, wherein the solution additionally comprises a lignin.

8. The method according to claim 1, wherein the lignin is derived from a lignin-containing pulp.

9. The method according to claim 1, wherein a solution comprising a lignocellulosic material dissolved in a distillable DBN-based ionic liquid is
extruded through a spinning nozzle,
shaped as filament or film by stretching the film or filament while still in solution to orient the molecules, and
after passing through the air-gap, the fibres or film are drawn through a water-containing spin bath, where the cellulose is regenerated.

10. The method according to claim 1, where any type of unbleached and bleached chemical pulp is used as raw material.

11. The method according to claim 1, wherein spinning is carried out by air-gap spinning, wet spinning, or dry-jet wet spinning.

12. The method according to claim 1, where the spinning solution has a zero shear viscosity between 5,000 and 70,000 Pas at spinning conditions.

13. The method according to claim 1, where the solvent is purified by vacuum distillation.

14. The method according to claim 1, wherein the cellulose fibre produced has a dry tenacity of >35 cN/tex and a wet-to-dry tenacity of >0.80.

15. The method according to claim 1, wherein the polysaccharides present in the lignocellulosic pulp undergo negligible degradation, if any, during the process.

16. The method according to claim 1, wherein the process causes negligible water pollution due to degradation products.

17. The method according to claim 1, wherein the fibres produced are suitable for use in woven or non-woven textiles, for technical purposes, or for use as carbon-fibre precursors.

18. The method according to claim 1, wherein the shaped article is a film or a fibre.

* * * * *